United States Patent [19]

Höller

[11] Patent Number: 5,103,587
[45] Date of Patent: Apr. 14, 1992

[54] FLOWERPOT ASSEMBLY

[76] Inventor: Josef Höller, Wackersberger Strasse 51a, 8172 Lenggries, Fed. Rep. of Germany

[21] Appl. No.: 651,765

[22] Filed: Feb. 7, 1991

[30] Foreign Application Priority Data

Feb. 10, 1990 [DE] Fed. Rep. of Germany ....... 4004136

[51] Int. Cl.⁵ .............................................. A01G 9/02
[52] U.S. Cl. ............................................ 47/75; 47/73
[58] Field of Search ................... 47/75, 78, 73, 66, 74

[56] References Cited

U.S. PATENT DOCUMENTS

| | | | |
|---|---|---|---|
| 2,741,875 | 4/1956 | van Staalduinen | 47/78 |
| 3,147,569 | 9/1964 | Murguia | 47/73 |
| 4,059,921 | 11/1977 | Moriwaki | 47/73 |
| 4,106,235 | 8/1978 | Smith | 47/66 |
| 4,223,480 | 9/1980 | Welty | 47/78 |
| 4,325,202 | 4/1982 | Liard | 47/73 |

FOREIGN PATENT DOCUMENTS

| | | | |
|---|---|---|---|
| 2729454 | 1/1978 | Fed. Rep. of Germany | 47/73 |
| 2544958 | 11/1984 | France | 47/75 |
| 262712 | 10/1949 | Switzerland | 47/73 |

Primary Examiner—Richard E. Chilcot, Jr.
Assistant Examiner—Joanne C. Downs
Attorney, Agent, or Firm—Juettner Pyle & Lloyd

[57] ABSTRACT

The flowerpot assembly comprises a flowerpot whose upper edge portion has formed thereon two diametrically opposed and radially outwardly oriented grip noses with which the flowerpot is hung or suspended in corresponding recesses formed in the upper edge portion of a flowerpot holder. The projections of the flowerpot are partly exposed to the outside, so that they can be gripped from underneath in order to remove the flowerpot from the flowerpot holder in a simple and easy way. The upper edge of the suspended flowerpot extends slightly below the upper edge of the flowerpot holder. A predetermined water accumulation chamber remains between the bottom of the flowerpot and the bottom of the flowerpot holder.

8 Claims, 2 Drawing Sheets

FLOWERPOT ASSEMBLY

BACKGROUND OF THE INVENTION

This invention relates to a flowerpot assembly comprising a flowerpot and a flowerpot holder in which the flowerpot is hung or suspended.

It is a common practice to insert a flowerpot, which contains a plant, into a flowerpot holder in order to improve the outward appearance or to increase the stability of a tall plant in this way. A general problem is that the size of the flowerpot is not adpated to the dimensions of the flowerpot holder. Hence, it often happens that the flowerpot fills the hollow space of the flowerpot holder only partly or, quite to the contrary, is slightly too large and gets therefore jammed in the flowerpot holder and projects beyond the upper edge portion thereof.

As a result, the desired advantageous appearance is impaired, and it may be rather difficult to remove the jammed flowerpot from the flowerpot holder. It is also troublesome and difficult to remove the flowerpot from the flowerpot holder in cases where the outer diameter of the flowerpot is smaller than that of the flowerpot holder. In some cases the only possible thing to do is to pull the potted plant upwards in the hope that the flowerpot will follow its example.

If the flowerpot is not oversized in comparison with the flowerpot holder and can thus be loosely inserted into the flowerpot holder, and if, moreover, the flowerpot includes a drainage hole in its bottom, such an assembly has so far had the additional disadvantage that there is virtually no water accumulation chamber below the bottom of the flowerpot, as the bottom of the flowerpot rests on the bottom of the flowerpot holder. Hence, excess water cannot flow out off the flowersoil, and the roots of the plant will therefore rot after some time. Such a damage could be avoided by frequently checking whether excess water has collected in the bottom area of the flowerpot holder. Such a routine check is however not carried out in practice because of the above-described difficulties arising during the removal of the flowerpot.

SUMMARY OF THE INVENTION

It is the object of the present invention to provide a flowerpot assembly of the above-mentioned type in such a way that the flowerpot can be removed quickly and easily from the flowerpot holder.

In the flowerpot assembly of the invention, the upper edge portion of the flowerpot is provided with at least two projections that project radially outwards and are preferably located at diametrically opposed places, whilst the flowerpot holder comprises two corresponding recesses that are open towards the upper edge and receive the projections of the flowerpot when the latter is inserted from above into the flowerpot holder. The recesses extend over the whole thickness of the wall, so that the radially outer surfaces of the projections of the flowerpot are at least partly exposed to the outside of the flowerpot. The flowerpot can be seized on the outwardly exposed surfaces of the projections and thus be lifted out of the flowerpot holder in a very easy way.

Since the flowerpot rests with its projections on the lower wall portion of the recesses of the flowerpot holder, it is ensured by the suitably dimensioned projections and recesses that the upper edge of the flowerpot extends slightly below the upper edge of the flowerpot holder. This does not only create a perfect optical impression, as the flowerpot which often consists of an unsightly material becomes virtually invisible thereby, but also prevents the water used for watering the plants from flowing over towards the outside of the flowerpot holder, with the volume of the flowerpot holder being optimally exploited at the same time.

Since the flowerpot is hung or suspended in the flowerpot holder, there remains a water accumulation chamber between the underside of the flowerpot and the bottom of the flowerpot holder. Said water accumulation chamber has e.g. a size of 5 to 13 mm in a preferred embodiment of the invention.

The projections are advantageously grip noses that are integrally formed on the flowerpot and thus consist of the same material as the flowerpot, for instance of plastics or clay. An important aspect is that the circumferential width of the grip noses is somewhat smaller than the width of the recesses, so that the projections cannot jam in the recesses.

It is, however, possible within the scope of the invention to secure, e.g. adhere, the projections to the flowerpot with the aid of suitable fastening means.

In an especially advantageous embodiment of the invention, the flowerpot holder has an outwardly stepped, preferably thickened edge portion over the entire height of which the recesses extend. As a result, the projections of the flowerpot which extend approximately up to the outer surface of the stepped edge portion of the flowerpot holder are exposed at their underside and can thus be gripped from below to remove the flowerpot. The removal of the flowerpot is further facilitated thereby.

If in the mounted state, in which the central longitudinal axis of the flowerpot coincides with that of the flowerpot holder, the radial side outer surfaces of the two projections are set back relative to the outer surface of the upper edge portion of the flowerpot holder, this definitely prevents a projection from protruding beyond the adjoining outer surface of the flowerpot holder. Hence, there is no risk of injury in this area. The outer surface of the two projections is expediently shaped as a cylindrical portion corresponding substantially to the shape of the adjoining outer surface of the flowerpot holder.

It is also possible within the scope of the present invention that the two projections protrude radially beyond the respectively surrounding outer surfaces of the flowerpot holder. Hence, they can be seized not only from below, but also at their protruding lateral edges, whereby the removal of the inner flowerpot might be facilitated.

Other features, advantages and details of the invention will become apparent from the following description of a preferred embodiment when taken in conjunction with the accompanying drawing in which:

IN THE DRAWINGS

DESCRIPTION OF THE PREFERRED EMBODIMENTS

The flowerpot assembly consists of a flowerpot holder 1 in which a flowerpot 2 is hung or suspended. Flowerpot 2 contains a plant (not shown). Flowerpot holder 1 and flowerpot 2 have a truncated shape with parallel side walls between which there remains a small spacing of e.g. 2 mm permitting an optimum use of the interior space of flowerpot holder 1.

Figure 1:
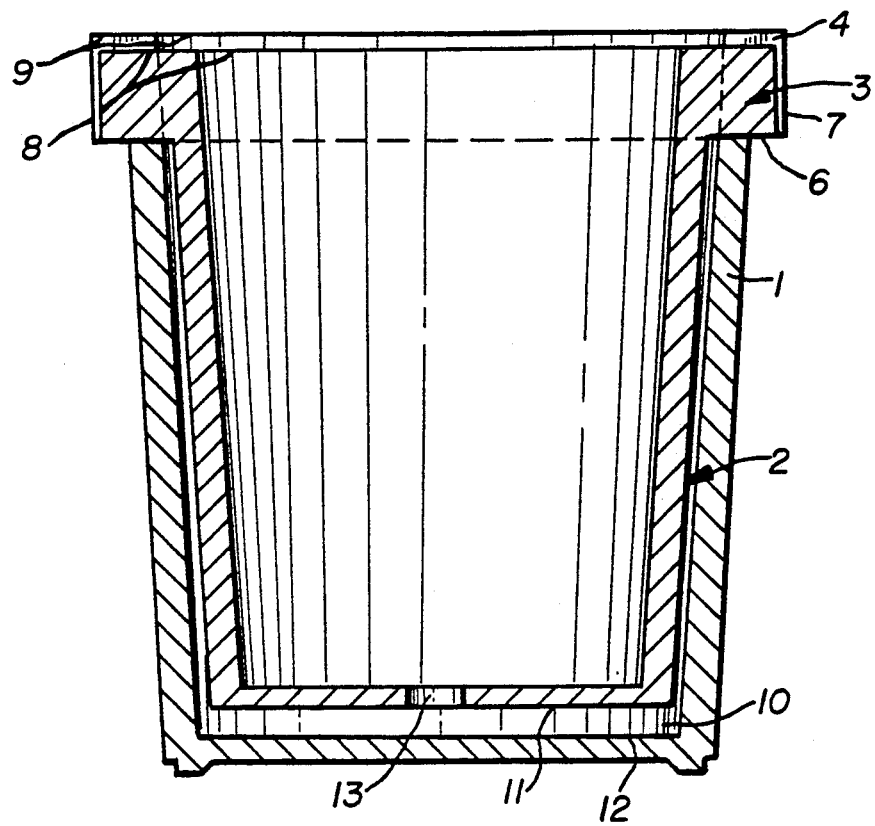
FIG. 1 is a vertical section through an embodiment of the flowerpot assembly of the invention.

The upper edge portion of flowerpot 2 has formed thereon two projections 3 that project radially outwards at diametrically opposed places and have a rectangular shape in longitudinal section (FIG. 1). Flowerpot holder 1 has a thickened, outwardly projecting edge portion 4 which has formed therein—also at diametrically opposed places—two recesses 5 that extend over the entire height of edge portion 4, as specifically illustrated in FIG. 2. Projections 3 project radially outwards to such an extent that a portion 6 of their bottom side is respectively exposed to the exterior, whereby projections 3 can be gripped from underneath to lift flowerpot 2 out of flowerpot holder 1. Furthermore, the radial outer side surfaces 7 of projections 3 are exposed to the exterior.

Hence, flowerpot 2 is hung or suspended by means of its projections 3 in flowerpot holder 1. In this position the upper edge 8 of flowerpot 2 is slightly below the upper edge 9 of flowerpot holder 1. This has the advantage that even if the plants are watered in a clumsy way, overflow of water is substantially prevented by the protruding edge of the upper edge portion 4.

Furthermore, a water accumulation chamber 10 is defined between bottom 11 of flowerpot 2 and bottom 12 of flowerpot holder 1 when flowerpot 2 is hung or suspended. Said water accumulation chamber 10 can receive water exiting through a drainage hole 13 in bottom 11 of flowerpot 2.

Figure 2:
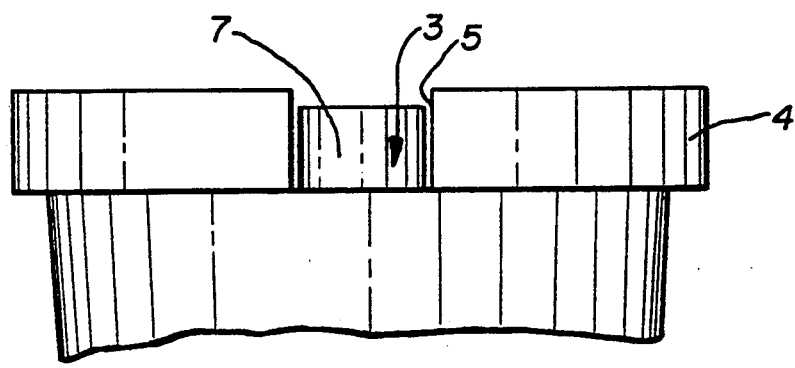
FIG. 2 is a side view of the upper edge portion of the flowerpot assembly of FIG. 1.
Figure 3:
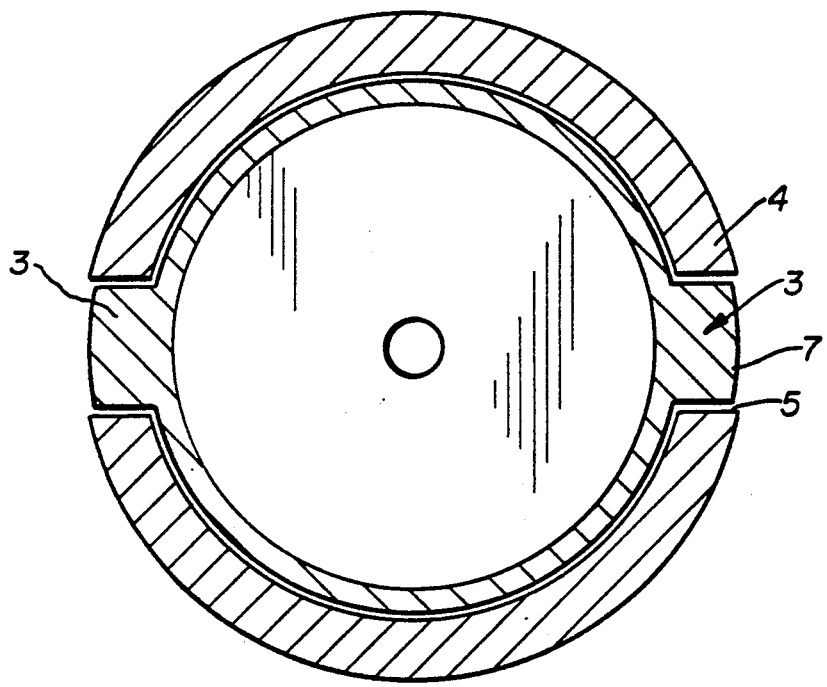
FIG. 3 is a horizontal section through the upper edge portion of the flowerpot assembly of FIG. 1.

As illustrated in FIG. 2, projections 3 have a somewhat smaller width than recesses 5, so that projections 3 cannot jam in recesses 5. In plan view the radial outer surface 7 of projections 3 has a circular arcuate shape which corresponds approximately to the circular shape of the outer surface of the upper edge portion 4 of flowerpot holder 1. The radial outer surfaces 7 of the two projections 3 are each set back relative to the adjoining outer surface of edge portions 4 to a degree corresponding to the interspace between the side walls of flowerpot holder 1 and flowerpot 2. It is thereby excluded that a projection 3 protrudes beyond the adjoining outer surface of the upper edge portion 4 of flowerpot holder 1.

Figure 4:
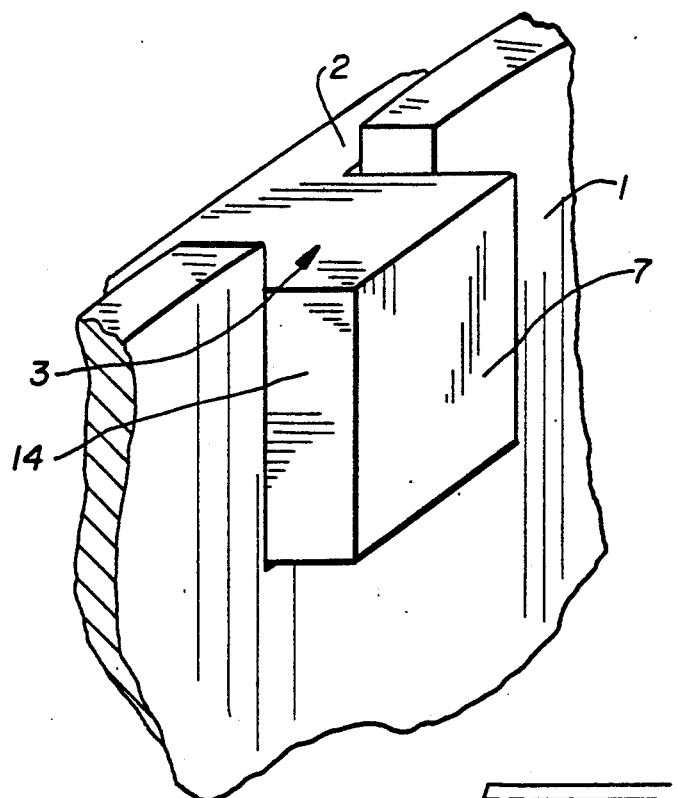
FIG. 4 is a modified embodiment of the invention.

In the modified flowerpot assembly shown in FIG. 4, flowerpot holder 1 is not provided with a thickened, outwardly projecting edge portion, as is the case with the above-described embodiment, and grip noses 3 project outwards beyond the outer surface of flowerpot holder 1. Hence, grip noses 3 can also be gripped at their lateral edges 14 for removing flowerpot 2 from flowerpot holder 1.

The height of grip noses 3 is 1/5 of the height of the flowerpot holder and thus 3 cm when the flowerpot holder is 15 cm high. The width of the grip nose is about 4/5 of its height, i.e. 2.4 cm in the present case. The resultant viewing surface may be optically designed in a special way. Apart from plastics or clay, ceramics and timber are preferred materials for flowerpot holders.

The cross-sectional shape of the flowerpot and the pot holder, respectively, is not limited to the illustrated circular form.

I claim:

1. A flowerpot assembly comprising a flowerpot holder having an open top and upper rim, a flowerpot having an open top and upper rim received in said holder, said flowerpot having at least two circumferentially spaced and outwardly extending projections on the upper rim, and a corresponding pair of upwardly open recesses in the upper rim of said holder receiving said projections, said projections having surfaces extending radially outwardly beyond the rim of said holder to facilitate removal of the flowerpot from the holder.

2. A flowerpot assembly as defined in claim 1, wherein said projections are grip noses formed integrally on said flowerpot.

3. A flowerpot assembly as defined in claim 1, additionally comprising fastening means for securing said projections to said flowerpot.

4. A flowerpot assembly as defined in claim 1, wherein said projections project radially outwards at diametrically opposed places.

5. A flowerpot assembly as defined in claim 1, wherein said upper rim of said flowerpot holder, is in the form of a thickened band, that said recesses extend over the entire height of said band, and that said projections have a bottom side and project radially outwards to such an extent that part of their bottom side is exposed to the outside.

6. A flowerpot assembly as defined in claim 5, wherein the rim of said holder and said projections have outer side surfaces, with the side surfaces of the projections being recessed relative to the side surfaces of the holder.

7. A flowerpot assembly as defined in claim 1, wherein the top of the rim of said flowerpot is spaced below the top of the rim of said flowerpot holder.

8. A flowerpot assembly as defined in claim 1, wherein the flowerpot and flowerpot holder have bottom walls which are spaced apart to define a water accumulation chamber.

* * * * *